United States Patent
Ito

(10) Patent No.: US 6,526,280 B1
(45) Date of Patent: Feb. 25, 2003

(54) SYSTEM FOR PERFORMING A SOFT HAND-OFF BETWEEN BASE TRANSCEIVER STATIONS UNDER CONTROL OF DIFFERENT BASE TRANSCEIVER STATION CONTROLLERS

(75) Inventor: Kosaku Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 398 days.

(21) Appl. No.: 09/619,483

(22) Filed: Jul. 19, 2000

(30) Foreign Application Priority Data

Jul. 27, 1999 (JP) .......................................... 11-211584

(51) Int. Cl.[7] .............................................. H04Q 7/20
(52) U.S. Cl. ...................... 455/442; 455/436; 455/437; 455/438; 455/443; 455/435; 370/331; 370/335; 370/342
(58) Field of Search ......................... 455/442, 435–439, 455/432, 443, 445, 422, 403; 370/331, 328, 329, 335, 338, 342

(56) References Cited

U.S. PATENT DOCUMENTS

| | | | | |
|---|---|---|---|---|
| 5,940,762 | A | * | 8/1999 | Lee et al. .................... 455/442 |
| 6,173,183 | B1 | * | 1/2001 | Abu-Amara et al. ........ 455/422 |
| 6,205,128 | B1 | * | 3/2001 | Le .............................. 370/331 |
| 6,259,920 | B1 | * | 7/2001 | Kusaki et al. .............. 455/442 |
| 2002/0053695 | A1 | * | 5/2002 | Liaw et al. ................. 455/436 |

FOREIGN PATENT DOCUMENTS

JP      10-271059       10/1998

* cited by examiner

Primary Examiner—Nguyen T. Vo
Assistant Examiner—Edan Orgad
(74) Attorney, Agent, or Firm—Foley & Lardner

(57) ABSTRACT

A system for performing a soft hand-off between base transceiver stations under control of different base transceiver station controllers, the system comprising: a first base transceiver station of which a mobile station subjected to the soft hand-off is under control before the soft hand-off; a second base transceiver station of which the mobile station is under control after the soft hand-off; a first base transceiver station controller which controls the first base transceiver station; and a second base transceiver station controller which controls the second base transceiver station; a physical channel which connects the first base transceiver station controller and the second base transceiver station controller; wherein a first upstream data packet is transmitted from the mobile station to a codec in the first base transceiver station controller via the first base transceiver station; wherein a second upstream data packet is transmitted from the mobile station to the codec via the second base transceiver station, the second base transceiver station controller, and the physical channel; wherein a first downstream data packet is transmitted from the codec to the mobile station via the first base transceiver station; and wherein a second down stream data packet is transmitted from the codec to the mobile station via the physical channel, the second base transceiver station controller, and the second base transceiver station.

10 Claims, 6 Drawing Sheets

SYSTEM FOR PERFORMING A SOFT HAND-OFF BETWEEN BASE TRANSCEIVER STATIONS UNDER CONTROL OF DIFFERENT BASE TRANSCEIVER STATION CONTROLLERS

BACKGROUND OF THE INVENTION

1. Field of the Invention

The present invention relates to a system for performing a soft hand-off between base transceiver stations under control of different base transceiver station controllers and particularly, to a system for performing a soft hand-off between CDMA (Code Division Multiple Access) base transceiver stations under control of different CDMA base transceiver station controllers.

2. Description of the Prior Art

In a conventional CDMA system, a soft hand-off system is generally used for performing a hand-off between base transceiver stations (hereinafter, referred to as BTS) under the same base transceiver station controller (hereinafter, referred to as BSC). However, either of a hard hand-off system or a soft hand-off system which is performed under control of a mobile-services switching center (hereinafter, referred to as MSC) is used for performing a hand-off between BTSs under control of different BSCs because, as shown in FIG. 6, BSCs 1401, 1501 in the conventional CDMA system have no header converter and the conventional CDMA system has no link used for soft hand-off between BSCs.

The hard hand-off system adopts a method of deleting a current path before establishing a new path because the hard hand-off system is not capable of establishing a plurality of paths at the same time. Therefore, the hard hand-off system has a disadvantage of a short break which deteriorates a quality of communication.

On the other hand, the soft hand-off system adopts a method of deleting a current path after establishing a new path because the soft hand-off system is capable of establishing a plurality of paths at the same time. Therefore, the soft hand-off system does not have a disadvantage of the short break.

However, when performing a conventional soft hand-off between BTSs under control of different BSCs, the MSC has to perform both an information management and path controls (or call-in connection controls) for BSCs, BTSs, and MSs under control of the MSC. Therefore, the MSC is burdened with an excessive load, and moreover, a delay time of a communication becomes long. Thus, when performing the conventional soft hand off between BTSs under control of different BSCs, a communication quality deteriorates.

SUMMARY OF THE INVENTION

In order to overcome the aforementioned disadvantages, the present invention has been made and accordingly, has an object to provide a system for performing a soft hand off between base transceiver stations under control of different base transceiver station controllers which do not deteriorate a communication quality.

According to an aspect of the present invention, there is provided a system for performing a soft hand-off between base transceiver stations under control of different base transceiver station controllers, the system comprising: a first base transceiver station of which a mobile station subjected to the soft hand-off is under control before the soft hand-off; a second base transceiver station of which the mobile station is under control after the soft hand-off; a first base transceiver station controller which controls the first base transceiver station; a second base transceiver station controller which controls the second base transceiver station; and a physical channel which connects the first base transceiver station controller with the second base transceiver station controller; wherein a first upstream data packet is transmitted from the mobile station to a codec in the first base transceiver station controller via the first base transceiver station; wherein a second upstream data packet is transmitted from the mobile station to the codec via the second base transceiver station, the second base transceiver station controller, and the physical channel; wherein a first downstream data packet is transmitted from the codec to the mobile station via the first base transceiver station; and wherein a second down stream data packet is transmitted from the codec to the mobile station via the physical channel, the second base transceiver station controller, and the second base transceiver station.

In the system for performing a soft hand-off between base transceiver stations under control of different base transceiver station controllers, the first base transceiver station controller may comprise a header converter which converts a header of the second upstream data packet which has been used to bring the second upstream data packet toward the first base transceiver station controller to another header which is used to bring the second upstream data packet toward the codec.

In the system for performing a soft hand-off between base transceiver stations under control of different base transceiver station controllers, the header of the second upstream data packet before the conversion may comprise: an identifier of an interface connected with the physical channel; an identifier of a switch port connected with the physical channel via the interface; and an identifier of the second base transceiver station controller.

In the system for performing a soft hand-off between base transceiver stations under control of different base transceiver station controllers, the header converter may perform the conversion when the header converter determines that the second upstream data packet comes from a non-local base transceiver station controller on the basis of the identifier of the second base transceiver station controller.

In the system for performing a soft hand-off between base transceiver stations under control of different base transceiver station controllers, the header of the second upstream data packet after the conversion may comprise: an identifier of the codec; and an identifier of a switch port which is connected with the codec.

In the system for performing a soft hand-off between base transceiver stations under control of different base transceiver station controllers, the second base transceiver station controller may comprise a header converter which converts a header of the second downstream data packet which has been used to bring the second downstream data packet toward the second base transceiver station controller to another header which is used to bring the second downstream data packet toward the mobile station.

In the system for performing a soft hand-off between base transceiver stations under control of different base transceiver station controllers, the header of the second downstream data packet before the conversion may comprise: an identifier of an interface connected with the physical channel; an identifier of a switch port connected with the physical channel via the interface; and an identifier of the first base transceiver station controller.

In the system for performing a soft hand-off between base transceiver stations under control of different base transceiver station controllers, the header converter may perform the conversion when the header converter determines that the second downstream data packet comes from a non-local base transceiver station controller on the basis of the identifier of first base transceiver station controller.

In the system for performing a soft hand-off between base transceiver stations under control of different base transceiver station controllers, the header of the second downstream data packet after the conversion may comprise: an identifier of an interface connected with the second base transceiver station; and an identifier of a switch port connected with the second base transceiver station via the interface.

In the system for performing a soft hand-off between base transceiver stations under control of different base transceiver station controllers, the header of the second downstream data packet after the conversion may further comprise an identifier of the second base transceiver station.

These and other objects, features and advantages of the present invention will become more apparent in the light of the following detailed description of the best mode embodiments thereof, as illustrated in the accompanying drawings.

DETAILED DESCRIPTION OF THE PREFERRED EMBODIMENT

Preferred modes of embodiment according to the present invention will be described with reference to the accompanying drawings.

Figure 1:
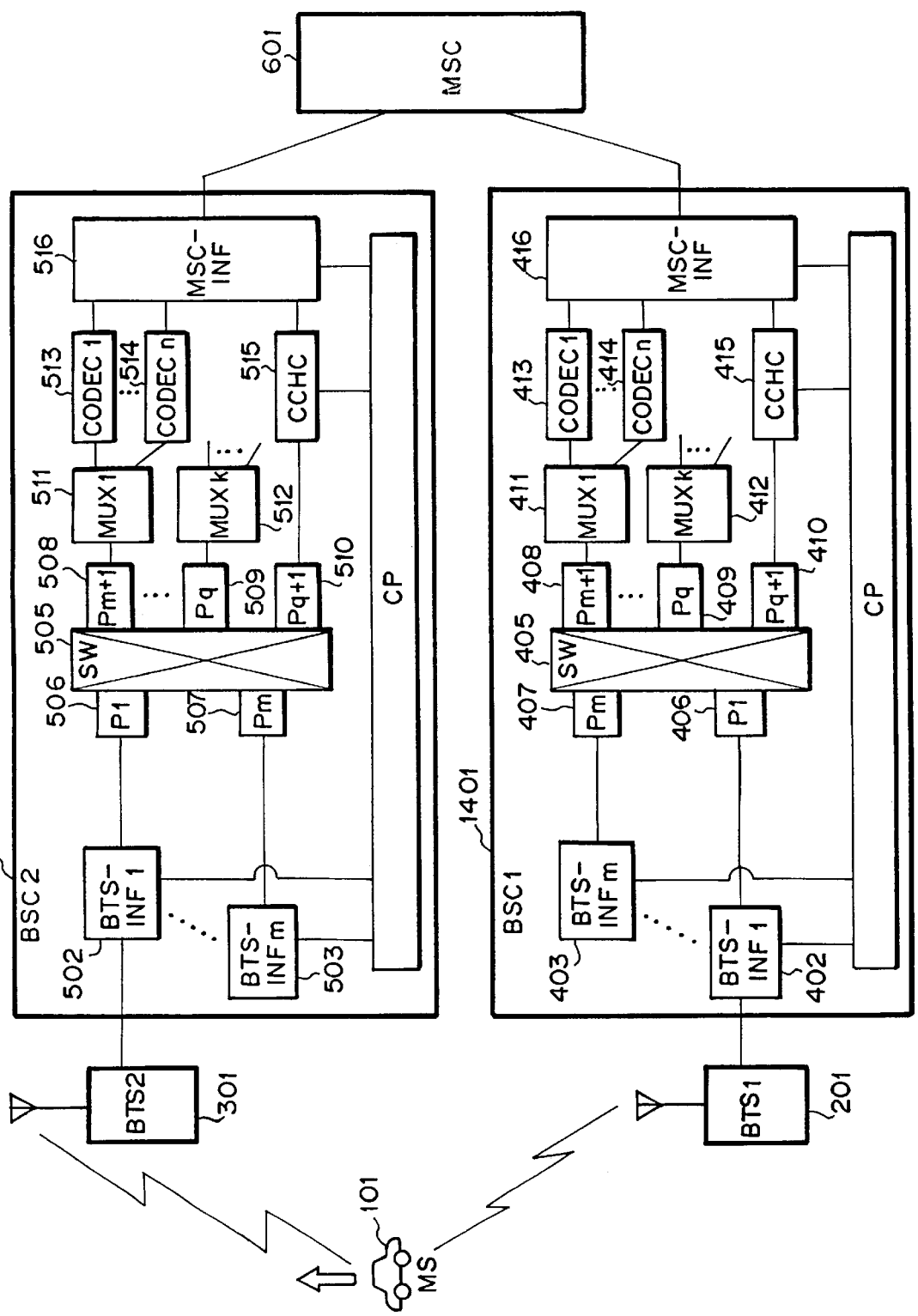
FIG. 1 is a block diagram showing a conventional hand-off system between CDMA base transceiver station controllers.
Figure 2:
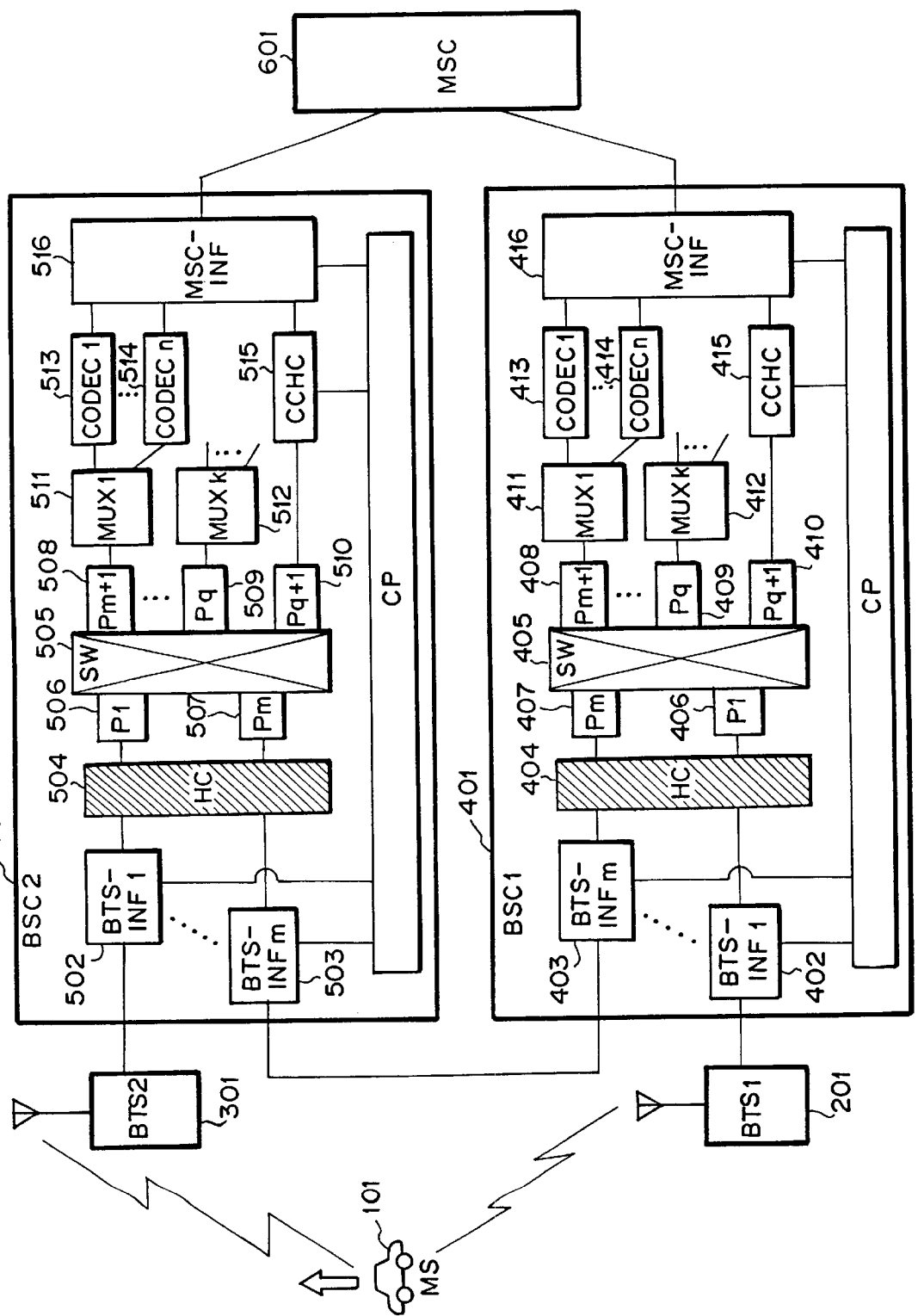
FIG. 2 is a block diagram showing a soft hand-off system between CDMA base transceiver station controllers according to an embodiment of the present invention.

Referring to FIG. 2, there is shown MS 101, BTS1 201, BTS2 301, BSC1 401, BSC2 501, and MSC 601. BTS-INF1 402 functions as an interface between BTS1 201 and BSC1 401. BTS-INF1 502 functions as an interface between BTS2 301 and BSC2 501.

Header converter (hereinafter, referred to as HC) 404 is a feature of the present invention and converts a header of a packets such as a data packet and a control packet in response to an instruction by control processor (hereinafter, referred to as CP) 417. HC 504 is similar to HC 404. Switch (hereinafter, referred to as SW) 405 connects any arbitrary port with another arbitrary port. SW 505 is similar to SW 405.

$P_1$ 406 to $P_m$ 407, $P_{m+1}$ 408 to $P_q$ 409, and $P_{q+1}$ 410 are connection ports which connect SW 405 with other apparatus such as BTS1 201, BSC2 501, and MSC 601. $P_1$ 506 to $P_m$ 507, $P_{m+1}$ 508 to $P_q$ 509, and $P_{q+1}$ 510 are similar to $P_1$ 406 to $P_m$ 407, $P_{m+1}$ 408 to $P_q$ 409, and $P_{q+1}$ 410.

MUX1 411 to MUXk 412 multiplex and demultiplex various data. MUX 511 to MUXk 512 are similar to MUX 411 to MUX 412. CODEC1 413 to CODECn 414 are coders/decoders which encode and decode communication data. CODEC1 513 to CODECn 514 are similar to CODEC1 413 to CODECn 414.

CCHC 415 is a control channel controller which outputs and inputs control data between BTS1 201 and BSC1 401. CCHC 515 is similar to CCHC 415.

MSC-INF 416 connects BSC1 401 with MSC 601. MSC-INF 516 is similar to MSC-INF 416. CP 417 controls the whole BSC1 401. CP 517 is similar to CP 417.

Figure 3:
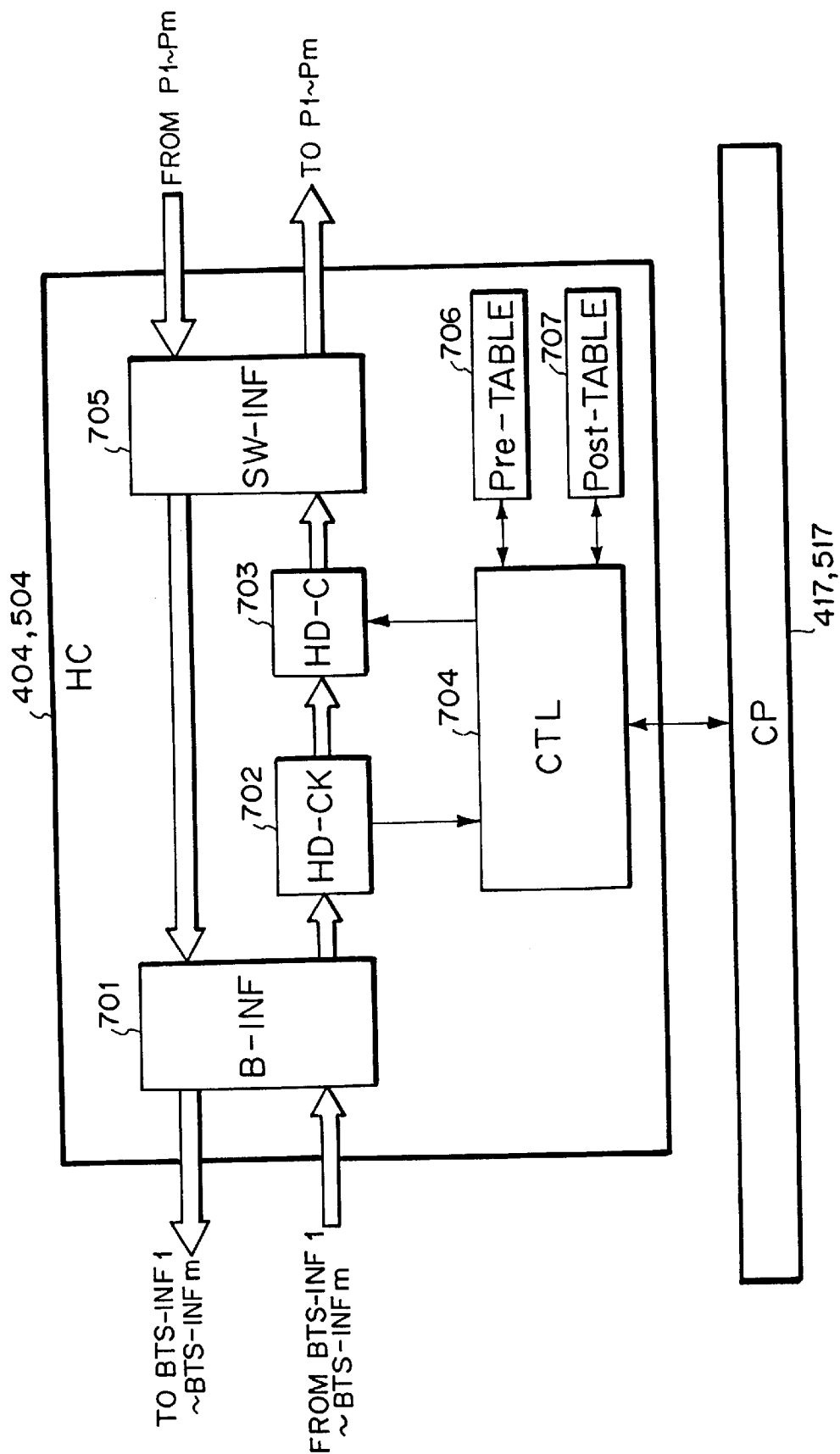
FIG. 3 is a block diagram showing the structure of a header converter according to the embodiment of the present invention.

Referring to FIG. 3, B-INF 701 is an interface with BTS-INF1 402 (or 502) to BTS-INFm 403 (or 503). HD-CK (header checker) 702 extracts a header from a data packet or a control packet which is supplied from B-INF 701 and supplies the header to CTL (controller) 704. HD-CK 702 also refers to a BSC-ID (BSC identifier) in the header to determine whether the packet containing the header is supplied from another BSC or a local BSC, and if the packet is supplied from another BSC, HD-CK 702 requests CTL 704 to perform a header conversion. HD-CK 702 supplies the packet without any modification to HD-C (header converter) 703.

If CTL 704 requests HD-C 703 to perform a header conversion, HD-C 703 converts the header of a packet supplied from HD-CK 702 to a header supplied from CTL 704 to output the packet. If CTL 704 does not request HD-C 703 to perform a header conversion, HD-C 703 outputs a packet supplied from HD-CK 702 without a header conversion.

CTL 704 writes header conversion information supplied from CP 417 or 517 to Pre-TABLE 706 or Post-TABLE 707.

If HD-CK 702 requests CTL 704 to perform a header conversion, CTL 704 searches pre-TABLE 706 for a header which is the same as the header supplied from HD-CK 702, and if the search is successful, CTL 704 retrieves an post-conversion header which corresponds to the header which is searched for from Post-TABLE 707. Then, CTL 704 requests HD-C 703 to perform a header conversion while supplying the retrieved header to HD-C 703.

CTL 704 manages the information for correlating pre-conversion headers and post-conversion headers. The information is supplied from CP 417 or 517.

Pre-TABLE 706 stores pre-conversion headers which are supplied from CP 417 or 517 via CTL 704. Post-TABLE 707 stores post-conversion headers which are supplied from CP 417 or 517 via CTL 704.

Next, the operation of this embodiment will be explained.

Referring to FIG. 2, it is assumed that MS 101 is communicating with a telephone or the like (not shown) via BTS1 201 while using CODEC1 413 in BSC1 401. On the communication lines are BTS-INF1 402, HC 404, $P_1$ 406, SW 405, $P_{m+1}$ 408, and MUX1 411.

When MS 101 travels to enter a coverage area of BTS2 301 which is under control of BSC2 501 and MS 101 detects that the radio wave from BTS2 301 becomes strong, MS 101 transmits a soft-hand-off request to BSC1 401 via BTS1 201. When receiving the request, BSC1 401 starts a control for establishing a communication path between MS 101 and CODEC1 413 in BSC1 401 via BTS2 301 and BSC2 501.

Next, the above control will be explained with reference to FIGS. 2 and 4.

Figure 4:
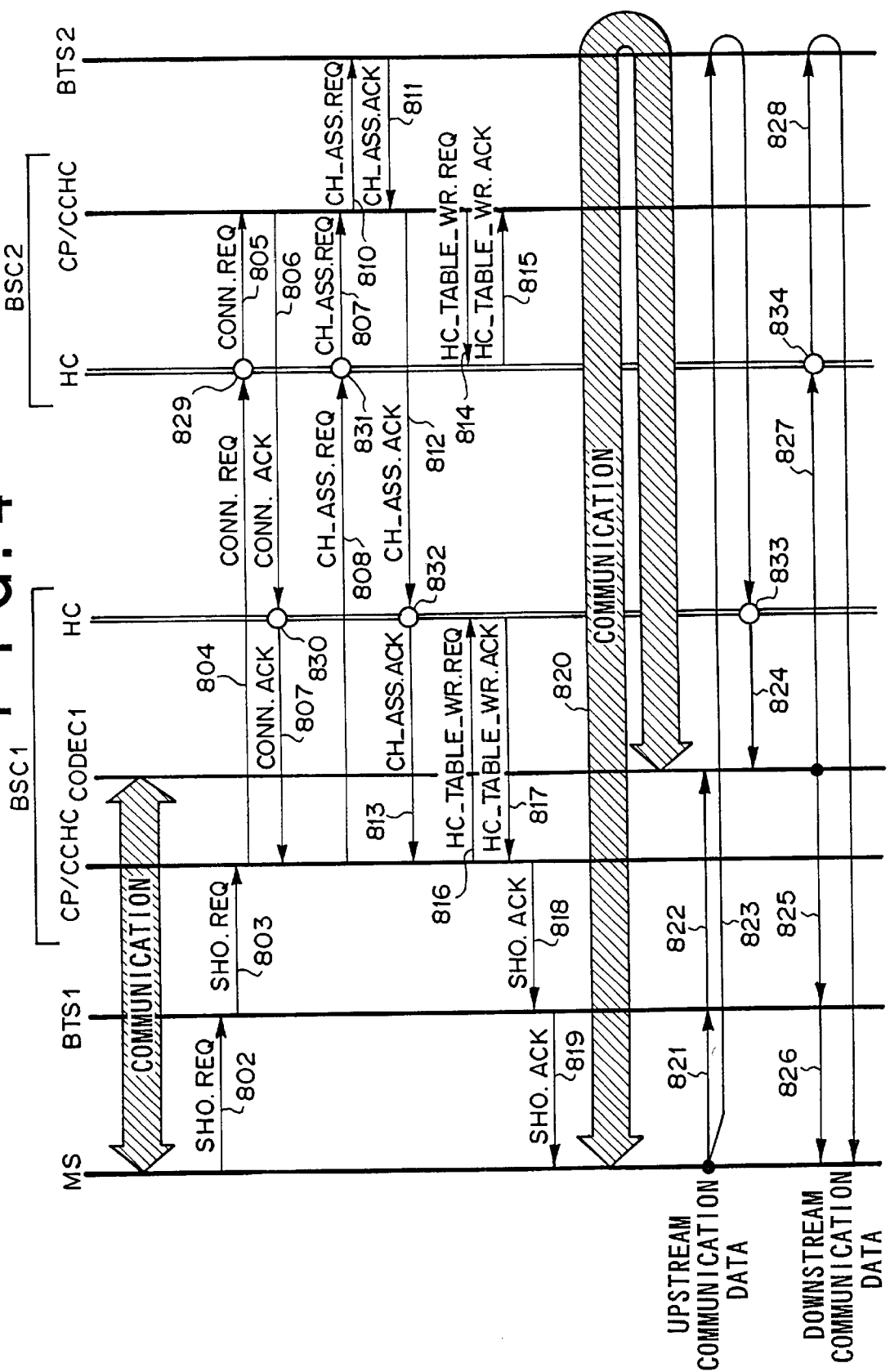
FIG. 4 is a sequence diagram showing a soft hand-off method between CDMA base transceiver station controllers according to the embodiment of the present invention.

Referring to FIG. 4, CP 417 and CCHC415 of BSC1 401 (hereinafter, referred to as CP/CCHC of BSC1 401) receive the soft hand-off request (SHO.REQ) from MS 101 via BTS1 201 (802, 803 in FIG. 4). Then, CP/CCHC of BSC1 401 transmits a connection request (hereinafter, referred to as CONN.REQ) to CP 517 and CCHC 515 of BSC2 501 (hereinafter, referred to as CP/CCHC of BSC2 501) via a physical link to confirm whether a physical link is established (or usable) between BSC1 401 and BSC2 504 (804, 805 in FIG. 4). Here, each physical link is a link connected by a cable. The number of physical links varies depending on the number of subscribers.

When CP/CCHC of BSC2 501 receives the CONN.REQ, if the physical link is established (or usable), CP/CCHC of BSC2 501 transmits a connection acknowledge (hereinafter, referred to as CONN.ACK) to CP/CCHC of BSC1 401 (806, 807 in FIG. 4) via a physical link . When CP/CCHC of BSC 1 401 receives the CONN.ACK, it determines that a physical link between BSC1 401 and BSC2 501 for soft hand-off is usable.

Next, CP/CCHC of BSC1 401 transmits a channel assignment request (hereinafter, referred to as CH_ASS.REQ) for establishing a communication channel between MS 101 and CODEC1 413 via BTS2 301 and BSC2 501 to CP/CCHC of BSC2 501 (808, 809 in FIG. 4) via a physical link.

Next, CP/CCHC of BSC2 501 transfers the CH_ASS.REQ to BTS2 301 (810 in FIG. 4). When CP/CCHC of BSC2 501 receives a channel assignment acknowledge (hereinafter, referred to as CH_ASS.ACK) from BTS 301 (811 in FIG. 4), CP/CCHC of BSC2 501 transfers the CH_ASS.ACK to CP/CCHC of BSC1 401 (812, 813 in FIG. 4) via a physical link. At this time, CP/CCHC of BSC1 401 determines that a communication channel between MS 101 and CODEC1 413 via BTS2 301 and BSC2 501 is able to be established.

After transferring the CH_ASS.ACK, CP/CCHC of BSC2 501 transmits a header conversion table write request (hereinafter, referred to as HC_TABLE_WR.REQ) to HC 504 in order to set header conversion information for the communication channel (814 in FIG. 4). HC 504 writes header 1503 in FIG. 5 to Pre-TABLE 706 and header 1504 in FIG. 5 to Post TABLE 707.

After normally setting the header conversion information, HC 504 transmits a header conversion table write acknowledge (HC_TABLE_WR.ACK) to CP/CCHC of BSC2 501 (815 in FIG. 4).

Similarly, After receiving the CH_ASS.ACK, CP/CCHC of BSC1 401 transmits a HC_TABLE_WR.REQ to HC 404 in order to set header conversion information for the communication channel (816 in FIG. 4). HC 404 writes header 1501 in FIG. 5 to Pre-TABLE 706 and header 1502 in FIG. 5 to Post TABLE 707.

After normally setting the header conversion information, HC 404 transmits a HC_TABLE_WR.ACK to CP/CCHC of BSC1 401 (817 in FIG. 4).

After completing the setting of the header conversion information, CP/CCHC of BSC1 401 transmits a soft hand-off acknowledge (SHO.ACK) to MS 101 via BTS1 201 to permit MS 101 to start a communication via BTS2 301 (818, 819 in FIG. 4).

After receiving the SHO.ACK, MS 101 starts a communication on the established communication channel via BTS2 301 (820 in FIG. 4).

The above-explained control realizes simultaneous communications (or soft hand-off state) between MS 101 and CODEC1 413 via BTS1 201 under control of BSC1 401 and via BTS2 301 under control BSC2 501.

Here, it is necessary not only to establish a physical link for soft hand-off between BSC1 401 and BSC2 501 but also to perform header conversions to realize the above-explained control.

The header conversions are performed in HCs 404 and 504 on the basis of the header conversion information which CPs 417 and 517 set to HCs 404 and 504, respectively. Referring to FIG. 4, the header conversions are performed in places marked with ○, that is, in places represented by 829 to 834.

In FIG. 4, header conversions 829 to 832 are performed before the header conversion information is dynamically set. Header conversions 829 to 832 do not use a communication channel but a control channel.

The control channel does not vary depending on each call as a communication channel but is fixed. Therefore, the header conversion information for the control channel is prestored in CP 417 in BSC1 401 and CP 517 in BSC2 501.

Therefore, when BSC1 401 and BSC2 501 are reset, CP 417 and 517 automatically set the header conversion information for the control channel to HC 404 and 504, respectively. Thus, the CONN.REQ, the CONN.ACK, the CH_ASS.REQ, and the CH_ASS.ACK are able to be transmitted between BSC1 401 and BSC2 501 with header conversions.

On the other hand, because a communication channel varies depending on a situations with respect to idles of CODECs at the time when an MS requests a soft hand-off, CP 417 and 517 set header conversion information to HC 404 and 504 every time a MS requests a soft hand-off, respectively.

Next, the route of a data packet when a soft hand off between BSCs 401 and 501 is performed will be explained with reference to FIGS. 2, 4, and 5.

As a result of the above-explained control, MS 101 is in a state of a soft hand-off (or a state of a simultaneous communication) between BSC1 401 and BSC2 501.

First, an upstream communication from MS 101 to CODEC1 413 via BTS2 301 and BSC2 501 will be explained.

Figure 5:
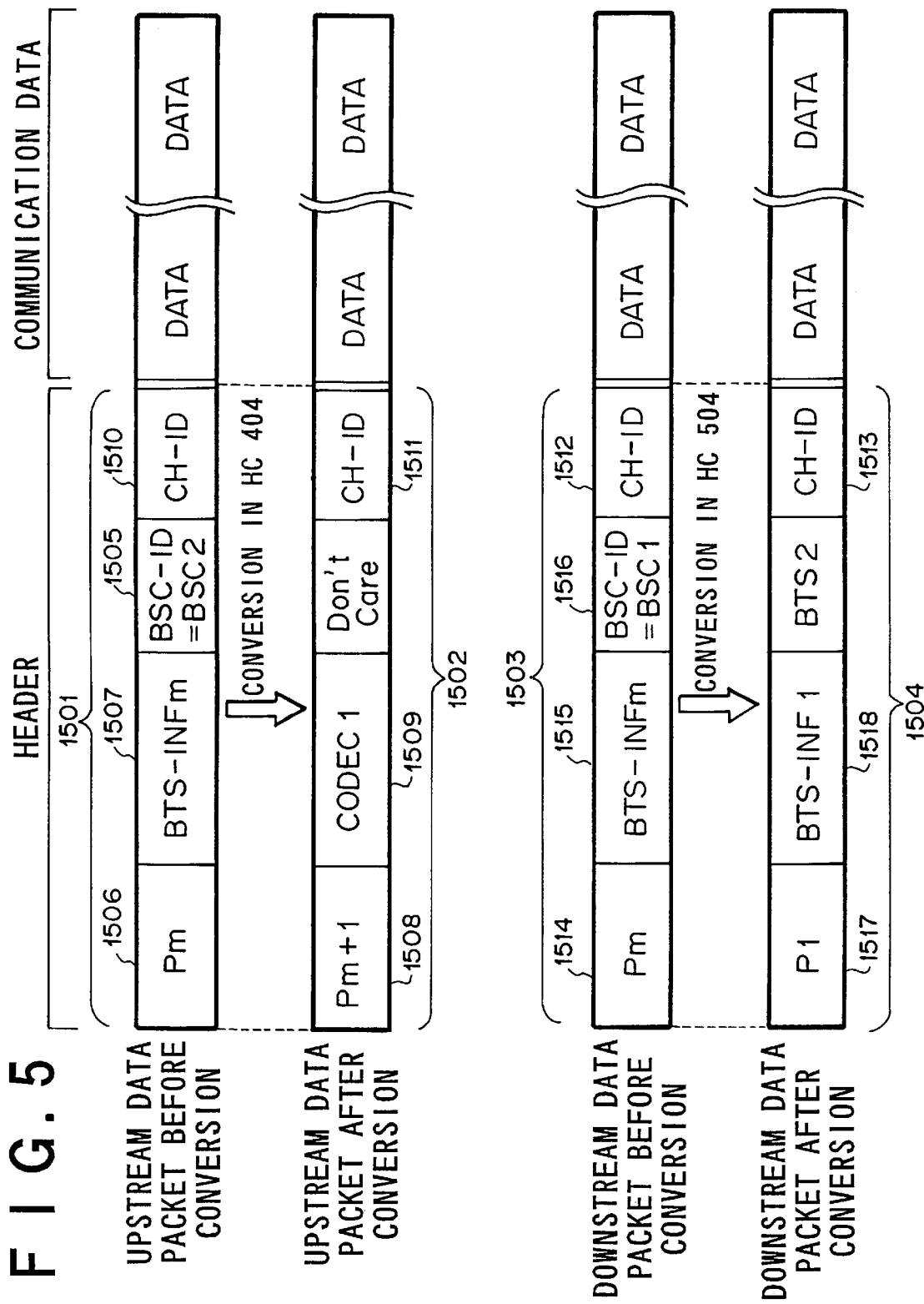
FIG. 5 is a schematic diagram showing formats of headers of upstream and downstream data packets before and after conversion according to the embodiment of the present invention.

Header information described in a header of an upstream data packet which is transmitted from MS 101 to BSC2 501 is as represented by reference 1501 in FIG. 5. Header 1501 is added to the upstream data packet in BTS2 301.

The upstream data packet is transmitted to BTS-INF1 502 without using header information 1501.

Because BTS-INFs are mere interfaces (or data relay apparatuses), BTS-INFs do not perform monitoring/discrimination with respect to data packets and merely receive data packets to transmit them. Therefore, BTS-INF1 502 receives the upstream data packet to transmit it to HC 504.

In general, HCs 404 and 504 determines whether a BSC-ID described in a header of an upstream packet is of a local BSC or of another (or non-local) BSC and if the BSC-ID is of local BSC, HCs 404 and 504 do not convert the header and merely transfers the upstream packet to a port which corresponds to a BTS-INF from which the upstream packet comes. The port which corresponds to a certain BTS-INF is determined uniquely because one or more BTS-INF corresponds to a single port. Therefore, HC 504 does not perform a header conversion and transmits the upstream data packet without any modification to $P_1$ 506.

SW 505 switches the upstream data packet to $P_m$ in accordance with the description of "$P_m$" 1506 in header 1501. The upstream data packet outputted from $P_m$ is transmitted to HC 504 again.

In general, HCs 404 and 504 do not perform monitoring/discrimination for a downstream packet and merely transmits a data packet received from a port to a BTS-INF which is designated by a description with respect to BTS-INF in a header. Therefore, HC 504 does not perform discrimination of BSC-ID 1505 of the upstream data packet (but temporarily a downstream data packet) and transmits the downstream data packet to BTS-INFm 503 in accordance with description of "BTS-INF$_m$" 1507 in header 1501.

The upstream data packet transmitted from BTS-INF$_m$ 503 reaches HC 404 via BTS-INF$_m$ 403.

In general, HCs 404 and 504 determines whether a BSC-ID described in a header of an upstream packet is of a local BSC or of another (or non-local) BSC and if the BSC-ID is of another (or non-local) BSC, HCs 404 and 504 convert the header and transfers the upstream packet to a port which corresponds to a BTS-INF from which the upstream packet comes. Therefore, HC 404 refers to BSC-ID 1505 and determines that the upstream data packet comes from BSC2 501. Then, HC 404 converts header 1501 of the upstream data packet to header 1502 using the information in CTL 704, Pre-TABLE 706, and Post-TABLE 707 designated by HC_TABLE_WR.REQ 816. This conversion is represented by reference 833 in FIG. 4.

HC 404 transmits the converted upstream data packet to $P_m$ 407 which corresponds to BTS-INFm 403. SW 405 switches the converted upstream data packet to $P_{m+1}$ in accordance with the description of "$P_{m+1}$" 1508 in header 1502.

The converted upstream data packet outputted from $P_{m+1}$ is supplied to MUX1 411. MUX1 411 transmits the converted upstream data packet to CODEC1 413 in accordance with the description of "CODEC1" 1509 in header 1502.

CH-IDs 1510, 1511, 1512, and 1513 are channel identifiers for discrimination as to whether the packet is a data packet, a control packet, or a broadcast packet.

As to an upstream communication from MS 101 to CODEC1 413 via BTS1 201, header 1502 is added to an upstream data packet in BTS1 201.

Next, a downstream communication from CODEC1 413 to MS 101 via BSC2 501 and BTS2 301 will be explained.

Header information described in a header of a downstream data packet which is transmitted from CODEC1 413 is as represented by reference 1503 in FIG. 5. The downstream data packet is transmitted to $P_m$ 407 in accordance with the description of "$P_m$" 1514 and BTS-INFm 403 in accordance with the description of "BTS-INFm" 1515 and reaches HC 504.

HC 504 converts header 1503 of the downstream data packet (but temporarily a upstream data packet) to header 1504 using the information in CTL 704, Pre-TABLE 706, and Post-TABLE 707 designated by HC_TABLE_WR.REQ 814 because there is a description of "BSC1" 1516 as BSC-ID indicating that the downstream data packet (but temporally an upstream data packet) comes from another (or non-local) BSC. This conversion is represented by reference 834 in FIG. 4.

HC 504 transmits the converted downstream data packet to $P_m$ 507 which corresponds to BTS-INFm 503. SW 505 switches the converted downstream data packet to $P_1$ in accordance with the description of "$P_1$" 1517 in header 1504.

The converted downstream data packet is supplied to HC 504 again. HC 504 does not convert the header of the converted downstream data packet and transmits the converted downstream data packet to BTS-INF1 502 in accordance with the description of "BTS-INF1" 1518. Then the converted downstream data packet is transmitted to MS 101 via BTS2 301.

As to an downstream communication from CODEC1 413 to MS 101 via BTS1 201, a header in which "P1", "BTS-INF1", "BTS1" and "CH-ID" are described is added to a downstream data packet from the first.

Next, the method for converting a header will be explained with reference to FIGS. 3 and 6.

Figure 6:
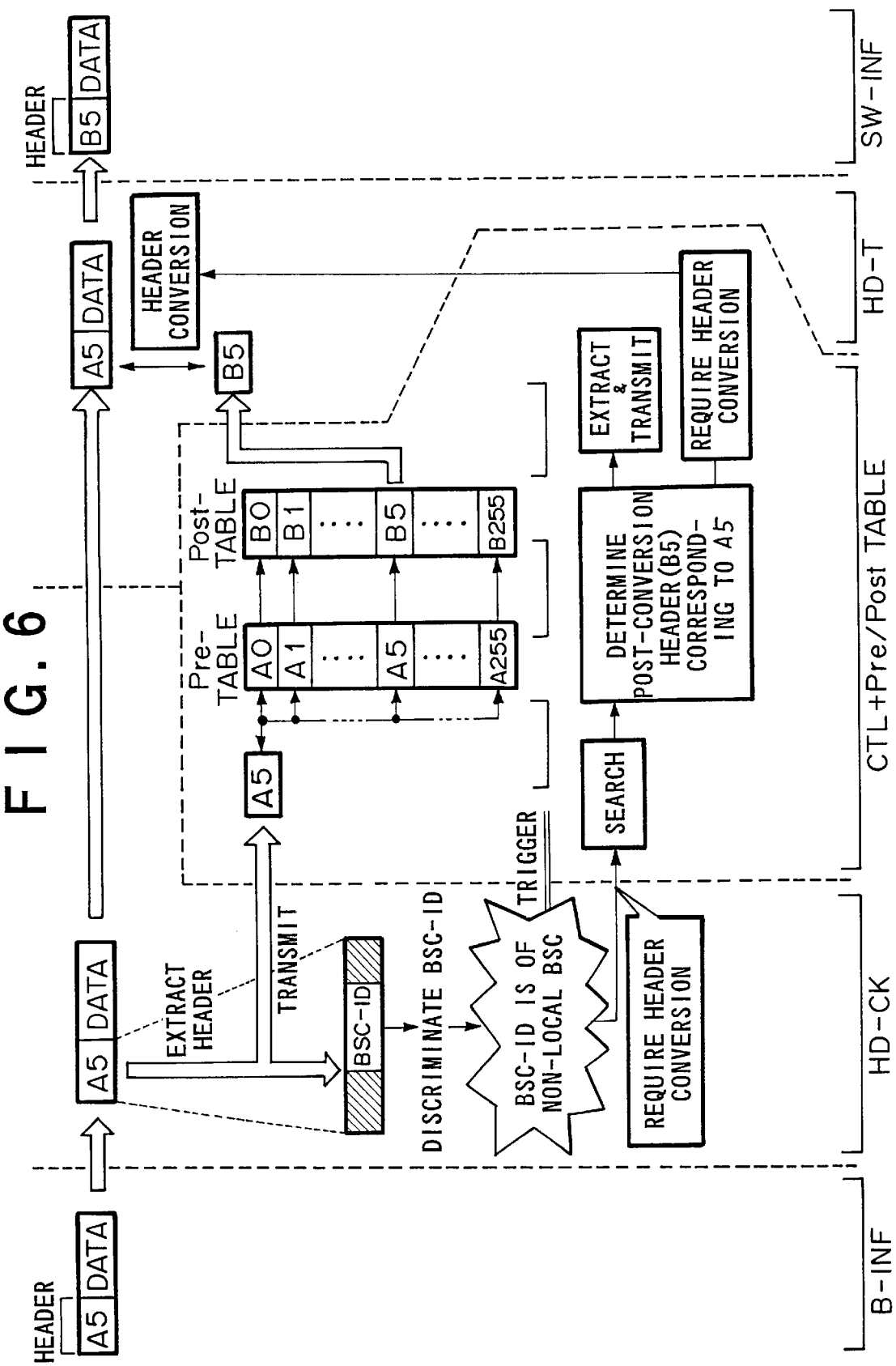
FIG. 6 is a schematic diagram showing a method for header conversion according to the embodiment of the present invention.

In FIG. 6, the header before conversion is represented by A5 and the header after conversion is represented by B5.

A packet received by BTS-INF is supplied to B-INF 701. B-INF 701 supplies the packet without any modification to HD-CK 702.

HD-CK 702 extracts header A5 from the packet to supply the extracted header A5 to CTL 704 as shown in FIG. 6.

Next, HD-CK 702 refers to a BSC-ID in the extracted header A5. If the BSC-ID is of another (or non-local) BSC, HD-CK 702 requests CTL 704 to perform a header conversion. On the other hand, if the BSC-ID is of a local BSC, HD-CK 702 does not request CTL 704 to perform a header conversion.

When requested to perform the header conversion, CTL 704 searches Pre-TABLE 706 for header A5. Pre-TABLE 706 stores various headers which CP 417 or 517 designate as headers subjected to header conversions. The storing such headers to Pre-TABLE 706 is performed by CTL 704 in accordance with an instruction by CP 417 or 517.

If Pre-TABLE 706 has been stored header A5, CTL 704 retrieves post-conversion header B5 which corresponds to header A5 from Post-TABLE 707. Post-TABLE 707 stores various headers which CP 417 or 517 designate as headers after conversions. The storing such headers to Post TABLE 707 is performed by CTL 704 in accordance with an instruction by CP 417 or 517.

Correlation between headers stored in Pre-TABLE 706 and headers stored in Post-TABLE 707 is held by CTL 704. Such correlation is designated by HC_TABLE_WR.REQ 816 or 814 from CP 417 or 517.

CTL 704 supplies the retrieved header B5 to HD-C 703 while requesting HD-C 703 to perform a header conversion.

When requested to perform a header conversion, HD-C 703 replaces original header AS to header B5 which is supplied from CTL 704 to supply the converted packet to SW-INF 705.

SW-INF 705 transmits the converted packet externally.

In the above embodiment, a header is modified to newly include an area exclusive for a BSC-ID used for determining whether to perform a header conversion. However, such an exclusive area is not a must. Alternatively, unused values of a CH-ID may be used for identifying BSC. For example, if valid values of a CH-ID consisting of 3 bits are 00H to 02H as shown below, the values of a CH-ID which may be used for identifying a BSC are 03H to 07H. The use of CH-ID for identifying a BSC may prevent change of the header format.

| CH-ID | type of channel |
|---|---|
| 00H | broadcast channel |
| 01H | data channel |
| 02H | control channel |
| 03H - 07H | not used |

In the above embodiment, a new physical link is established between BSCs for a soft hand-off between BSCs. Alternatively, a link between a BSC and a MSC may realize soft hand-off between BSCs without newly establishing a physical link between BSCs.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A system for performing a soft hand-off between base transceiver stations under control of different base transceiver station controllers, said system comprising:
   a first base transceiver station of which a mobile station subjected to said soft hand-off is under control before said soft hand-off;
   a second base transceiver station of which said mobile station is under control after said soft hand-off;
   a first base transceiver station controller which controls said first base transceiver station;
   a second base transceiver station controller which controls said second base transceiver station; and
   a physical channel which connects said first base transceiver station controller with said second base transceiver station controller;
   wherein a first upstream data packet is transmitted from said mobile station to a codec in said first base transceiver station controller via said first base transceiver station;
   wherein a second upstream data packet is transmitted from said mobile station to said codec via said second base transceiver station, said second base transceiver station controller, and said physical channel;
   wherein a first downstream data packet is transmitted from said codec to said mobile station via said first base transceiver station; and
   wherein a second down stream data packet is transmitted from said codec to said mobile station via said physical channel, said second base transceiver station controller, and said second base transceiver station.

2. The system for performing a soft hand-off between base transceiver stations under control of different base transceiver station controllers according to claim 1, wherein said first base transceiver station controller comprises a header converter which converts a header of said second upstream data packet which has been used to bring said second upstream data packet toward said first base transceiver station controller to another header which is used to bring said second upstream data packet toward said codec.

3. The system for performing a soft hand-off between base transceiver stations under control of different base transceiver station controllers according to claim 2, wherein said header of said second upstream data packet before the conversion comprises:
   an identifier of an interface connected with said physical channel;
   an identifier of a switch port connected with said physical channel via said interface; and
   an identifier of said second base transceiver station controller.

4. The system for performing a soft hand-off between base transceiver stations under control of different base transceiver station controllers according to claim 3, wherein said header converter performs the conversion when said header converter determines that said second upstream data packet comes from a non-local base transceiver station controller on the basis of said identifier of said second base transceiver station controller.

5. The system for performing a soft hand-off between base transceiver stations under control of different base transceiver station controllers according to claim 2, wherein said header of said second upstream data packet after the conversion comprises:
   an identifier of said codec; and
   an identifier of a switch port which is connected with said codec.

6. The system for performing a soft hand-off between base transceiver stations under control of different base transceiver station controllers according to claim 1, wherein said second base transceiver station controller comprises a header converter which converts a header of said second downstream data packet which has been used to bring said second downstream data packet toward said second base transceiver station controller to another header which is used to bring said second downstream data packet toward said mobile station.

7. The system for performing a soft hand-off between base transceiver stations under control of different base transceiver station controllers according to claim 6, wherein said header of said second downstream data packet before the conversion comprises:
   an identifier of an interface connected with said physical channel;
   an identifier of a switch port connected with said physical channel via said interface; and
   an identifier of said first base transceiver station controller.

8. The system for performing a soft hand-off between base transceiver stations under control of different base transceiver station controllers according to claim 7, wherein said header converter performs the conversion when said header converter determines that said second downstream data packet comes from a non-local base transceiver station controller on the basis of said identifier of first base transceiver station controller.

9. The system for performing a soft hand-off between base transceiver stations under control of different base transceiver station controllers according to claim 6, wherein said header of said second downstream data packet after the conversion comprises:
   an identifier of an interface connected with said second base transceiver station; and
   an identifier of a switch port connected with said second base transceiver station via said interface.

10. The system for performing a soft hand-off between base transceiver stations under control of different base transceiver station controllers according to claim 9, wherein said header of said second downstream data packet after the conversion further comprises an identifier of said second base transceiver station.

* * * * *